Feb. 7, 1950      E. SINGER      2,497,020
CUSHIONING DEVICE FOR FLUID CONDUITS
Filed Jan. 24, 1947
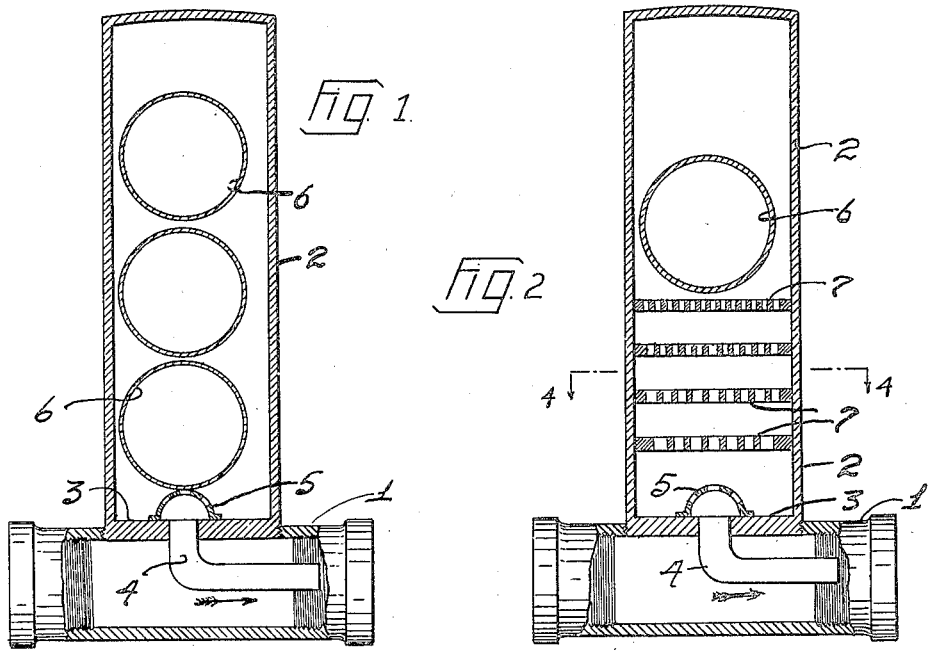
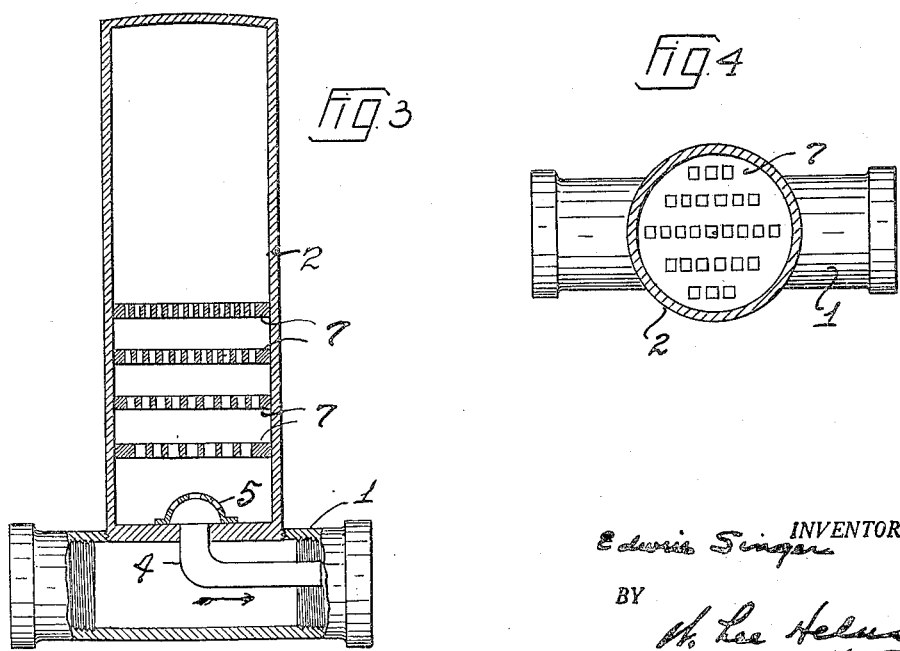
INVENTOR.
Edwin Singer
BY Patented Feb. 7, 1950

2,497,020

UNITED STATES PATENT OFFICE 2,497,020

CUSHIONING DEVICE FOR FLUID CONDUITS

Edwin Singer, Harris, N. Y., assignor of one-half to George B. Westenheffer, Harrisburg, Pa.

Application January 24, 1947, Serial No. 724,100

3 Claims. (Cl. 138—26)

In trunk line conduits for hot or cold water under pressure, the flowing water when suddenly shut off exerts a ram effect upon structural parts of the water system, because the flow pressure suddenly rises to a substantially higher degree when the flow is stopped by closing a valve or valves. This causes sharp metallic sounds or chattering, which is highly objectionable.

It is the object of my invention to provide simple and effective means for so throttling or cushioning the water or other liquid as to in time eliminate the ram effect of the flowing water in water systems of the kind described when the water is shut off. The characteristic of my invention is that the flow of the liquid causes a partial vacuum in a chamber communicating with the trunk line or auxiliary thereof. The flow of the liquid itself, and the reaction of the liquid when its flow is shut off is directed to and within the vacuum chamber and preferably against cushioning or throttling elements therein, so that chattering and other noises ordinarily produced are wholly eliminated.

The invention will be described with reference to the accompanying drawing, in which:

Fig. 1 is a vertical section through an embodiment of the invention applied to a flow pipe connection for a hot or cold water trunk line;

Fig. 2 is a view similar to Fig. 1 illustrating a modified form of our device;

Fig. 3 is a view similar to Fig. 2 employing throttle plates only as the cushioning means; and Fig. 4 is a horizontal section on the line 4—4, Fig. 2.

Referring to the drawings, I have shown at 1 an inset pipe having threaded ends and thus adapted to form part of a trunk line for hot or cold water. The member 1 may be formed with a flat seat at its top, which seat is apertured and the wall of the aperture threaded to receive the threaded lower area of vacuum chamber 2.

The vacuum chamber is preferably in the form of an elongated and inverted cup, having an open lower end which will be closed by a plug 3. This plug is provided with an axial aperture to receive one end of an angularly bent tube 4, and the latter for its major length will lie within member 1 and have its free end directed toward the direction of flow of the water.

Above its connection with tube 4, plug 3 may carry a strainer or screen, as indicated at 5. Above the strainer and within the vacuum chamber 2 will be disposed one or a plurality of cushioning or throttling members.

In Fig. 1 the cushioning members consist of hollow balls 6 which are adapted for mutual impact in order to take up shock. In Fig. 2 a cushioning ball 6 is employed in conjunction with a plurality of perforated disks 7 within the vacuum chamber, the disks being relatively spaced and, running toward the top of the vacuum chamber, of successively decreased perforation areas in order to give controlled throttling effect for the water.

In the structure of Fig. 3 the throttle plates or disks 7 are used alone, the cushioning ball being eliminated.

In the operation of my device it will serve its designed function in any flow line for liquids, and the inset pipe 1 will form a part of the fluid flow line. The inset pipe is arranged so that the tube 4 will have its free end directed toward the direction of flow of the liquid. Therefore, the flowing liquid will exert a suction and produce a partial vacuum within the vacuum chamber just as soon as liquid flows through the inset pipe. The degree of the vacuum will depend upon the duration and speed of flow.

When the water or other fluid is suddenly shut off it will, in its reaction, flow through tube 4 into the vacuum chamber, and this at a higher rate of speed, due to the action of the partial vacuum. This will be checked by the cushioning action of the balls 6, and I prefer that the latter be hollow and flexible, suitable materials being rubber and plastics. In the action of that form of my device which incorporates throttle plates or disks, the in-rushing water will be offered successively greater resistance by the apertured disks or throttle plates, and ordinarily an additional cushioning element such as one or more of the balls 6 will be unnecessary.

Having described my invention, what I claim and desire to secure by Letters Patent is as follows:

1. In a cushioning device for fluid conduits, an inset pipe adapted as part of a flow line for a fluid, a vacuum chamber carried by the inset pipe, a suction tube leading from the vacuum chamber and extended within the inset pipe in the direction of liquid flow therethrough, and a plurality of cushioning devices within the vacuum chamber.

2. In a cushioning device for fluid conduits, an inset pipe adapted as part of a flow line for a fluid, a vacuum chamber carried by the inset pipe, a suction tube leading from the vacuum chamber and extended within the inset pipe in the direction of liquid flow therethrough, and a plurality of spaced apertured disks within the vacuum chamber.

3. In a cushioning device for fluid conduits, an inset pipe adapted as part of a flow line for a fluid, a vacuum chamber carried by the inset pipe, a suction tube leading from the vacuum chamber and extending within the inset pipe in the direction of liquid flow therethrough, and a plurality of spaced apertured disks within the vacuum chamber, the apertures of the lowermost disks being greatest in size and the apertures of the remaining disks being successively smaller toward the top of the chamber.

EDWIN SINGER.

REFERENCES CITED

The following references are of record in the file of this patent:

UNITED STATES PATENTS

| Number | Name | Date |
|---|---|---|
| 360,326 | Richert | Mar. 29, 1887 |

FOREIGN PATENTS

| Number | Country | Date |
|---|---|---|
| 618 | Great Britain | of 1888 |
| 817,199 | France | of 1937 |